US006850983B2

(12) United States Patent
Rezaiifar et al.

(10) Patent No.: US 6,850,983 B2
(45) Date of Patent: Feb. 1, 2005

(54) METHOD AND APPARATUS FOR SERVICE AUTHORIZATION IN A COMMUNICATION SYSTEM

(75) Inventors: Ramin Rezaiifar, San Diego, CA (US); Paul E. Bender, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 363 days.

(21) Appl. No.: 09/956,579

(22) Filed: Sep. 18, 2001

(65) Prior Publication Data

US 2003/0055964 A1 Mar. 20, 2003

(51) Int. Cl.[7] ............................................. G06F 15/16
(52) U.S. Cl. ..................... 709/227; 709/217; 709/219; 709/227; 709/228; 709/249; 705/35
(58) Field of Search ............................... 709/217, 219, 709/225, 249, 226–229; 705/35

(56) References Cited

U.S. PATENT DOCUMENTS

| | | | |
|---|---|---|---|
| 4,901,307 A | 2/1990 | Gilhousen et al. | |
| 5,103,459 A | 4/1992 | Gilhousen et al. | |
| 5,504,773 A | 4/1996 | Padovani et al. | |
| 6,347,307 B1 * | 2/2002 | Sandhu et al. | 705/35 |
| 6,412,007 B1 * | 6/2002 | Bui et al. | 709/227 |
| 6,571,287 B1 * | 5/2003 | Knight et al. | 709/225 |

FOREIGN PATENT DOCUMENTS

| | | |
|---|---|---|
| WO | WO 99/28805 | 6/1999 |
| WO | WO 01/31843 A2 | 5/2001 |

OTHER PUBLICATIONS

Carolyn B. Seaman, AAA: a modeling language for software production environments, 1992, IBM Press, Proceedings of the 1992 conference of the Centre for Advanced Studies on Collaborative research—vol. 1, pp. 513–530.*

De Laat, C. et al., "RFC 2903 Generic AAA Architecture," Network Working Group Request For Comments 2903, 1–26, Aug. 2000. URL:ftp//ftp.isi.edu/in–notes/rfc2903.txt.

* cited by examiner

Primary Examiner—Shabana Qureshi
(74) Attorney, Agent, or Firm—Philip Wadsworth; Sandra L. Godsey; Pavel Kolousek

(57) ABSTRACT

Methods and apparatus for authorizing an access terminal (AT) requesting a service provided by an entity in an access network are disclosed. After being authorized for a communication session with the access network, the AT addresses an inquiry to a domain name server (DNS) for a contact of a service selector (SS) administering the desired service. A controller in the access network (BSC/PCF) routs the inquiry to and returns a response from the DNS. The AT then addresses a service query containing the AT's capabilities to the SS. The BSC/PCF directs attributes allowing the SS to authorize the service. Upon the SS's acknowledgement of the attributes, the BSC/PCF forwards to the SS the service query. Upon authorization, the SS notifies the BSC/PCF, and if the AT is authorized, selects in accordance with the AT's capabilities an appropriate service provider (SP) to provide the service.

44 Claims, 3 Drawing Sheets

METHOD AND APPARATUS FOR SERVICE AUTHORIZATION IN A COMMUNICATION SYSTEM

BACKGROUND

1. Field

The present invention relates generally to communication systems, and more specifically to a method and an apparatus for service authorization in a communication system.

2. Background

Communication systems have been developed to allow transmission of information signals from an origination station to a physically distinct destination station. In transmitting information signal from the origination station over a communication channel, the information signal is first converted into a form suitable for efficient transmission over the communication channel. Conversion, or modulation, of the information signal involves varying a parameter of a carrier wave in accordance with the information signal in such a way that the spectrum of the resulting modulated carrier is confined within the communication channel bandwidth. At the destination station the original information signal is replicated from the modulated carrier wave received over the communication channel. Such a replication is generally achieved by using an inverse of the modulation process employed by the origination station.

Modulation also facilitates multiple-access, i.e., simultaneous transmission and/or reception, of several signals over a common communication channel. Multiple-access communication systems often include a plurality of remote subscriber units requiring intermittent service of relatively short duration rather than continuous access to the common communication channel. Several multiple-access techniques are known in the art, such as time division multiple-access (TDMA), frequency division multiple-access (FDMA), and amplitude modulation multiple-access (AM). Another type of a multiple-access technique is a code division multiple-access (CDMA) spread spectrum system that conforms to the "TIA/EIA/IS-95 Mobile Station-Base Station Compatibility Standard for DualMode Wide-Band Spread Spectrum Cellular System," hereinafter referred to as the IS-95 standard. The use of CDMA techniques in a multiple-access communication system is disclosed in U.S. Pat. No. 4,901,307, entitled "SPREAD SPECTRUM MULTIPLE-ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention.

A multiple-access communication system may be a wireless or wire-line and may carry voice and/or data. An example of a communication system carrying both voice and data is a system in accordance with the IS-95 standard, which specifies transmitting voice and data over the communication channel. A method for transmitting data in code channel frames of fixed size is described in detail in U.S. Pat. No. 5,504,773, entitled "METHOD AND APPARATUS FOR THE FORMATTING OF DATA FOR TRANSMISSION", assigned to the assignee of the present invention. In accordance with the IS-95 standard, the data or voice is partitioned into code channel frames that are 20 milliseconds wide with data rates as high as 14.4 Kbps. Additional examples of a communication systems carrying both voice and data comprise communication systems conforming to the "3rd Generation Partnership Project" (3GPP), embodied in a set of documents including Document Nos. 3G TS 25.211, 3G TS 25.212, 3G TS 25.213, and 3G TS 25.214 (the W-CDMA standard), or "TR-45.5 Physical Layer Standard for cdma2000 Spread Spectrum Systems" (the IS-2000 standard).

In a multiple-access communication system, communications between users are conducted through one or more base stations. A first user on one subscriber station communicates to a second user on a second subscriber station by transmitting data on a reverse link to a base station. The base station receives the data and can route the data to another base station. The data is transmitted on a forward link of the same base station, or the other base station, to the second subscriber station. The forward link refers to transmission from a base station to a subscriber station and the reverse link refers to transmission from a subscriber station to a base station. Likewise, the communication can be conducted between a first user on one mobile subscriber station and a second user on a landline station. A base station receives the data from the user on a reverse link, and routes the data through a public switched telephone network (PSTN) to the second user. In many communication systems, e.g., IS-95, W-CDMA, IS-2000, the forward link and the reverse link are allocated separate frequencies.

An example of a data only communication system is a high data rate (HDR) communication system that conforms to the TIA/EIA/IS-856 industry standard, hereinafter referred to as the IS-856 standard. This HDR system is based on a communication system disclosed in co-pending application Ser. No. 08/963,386, entitled "METHOD AND APPARATUS FOR HIGH RATE PACKET DATA TRANSMISSION," filed Nov. 3, 1997, assigned to the assignee of the present invention. The HDR communication system defines a set of data rates, ranging from 38.4 kbps to 2.4 Mbps, at which an access point (AP) may send data to a subscriber station (access terminal, AT). Because the AP is analogous to a base station, the terminology with respect to cells and sectors is the same as with respect to voice systems.

With the development and increasing sophistication of communications systems, the communications systems offer not only those services for which the communications systems were primarily designed, e.g., voice or data, but also additional services, e.g., position location, broadcast services, group services, and other services known to one of ordinary skills in the art. Addition of such services into existing communications systems poses several challenges. For example, an access network must determine whether an access terminal is authorized to receive requested service. The authorization process should be independent of a particular service because different carriers may choose to implement different services, and adding or removing a service should not require change (hardware or software) to the service independent part of the access network. Furthermore, the service authorization should account for a mobility of the access terminals.

There is, therefore, a need in the art for a method and an apparatus for service authorization in a communication system that can be used for authorization of any service that the access network provides to the access terminal with no changes to the service independent part of the access network.

SUMMARY

In one aspect of the invention, the above-stated needs are addressed by receiving at a controller a service query addressed to a service selector; providing from the controller a set of parameters to the service selector in accordance with said service query; and authorizing at the service selector said service in accordance with said set of parameters.

In another aspect of the invention, the above-stated needs are addressed by determining at the subscriber station an address of the service selector, which administers the desired service and transmitting a service query to the controller addressed to the service selector.

In another aspect of the invention, when the service selector authorizes the service, the service selector selects in accordance with the service query received from the controller a service provider capable of providing the service.

DETAILED DESCRIPTION

Definitions

Figure 1:
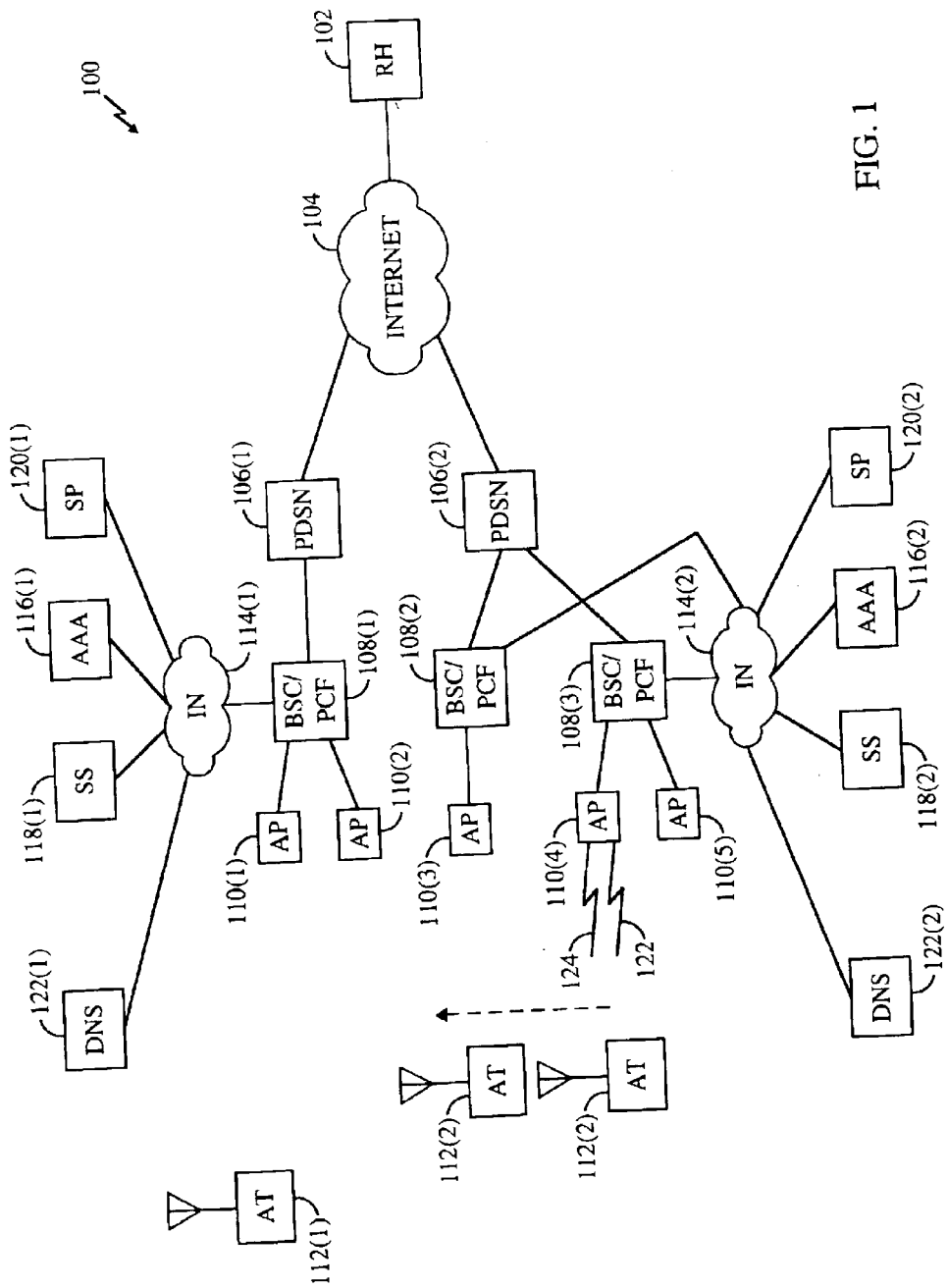
FIG. 1 illustrates a conceptual diagram of an HDR communication system.

The word "exemplary" is used exclusively herein to mean "serving as an example, instance, or illustration." Any embodiment described herein as "exemplary" is not necessarily to be construed as preferred or advantageous over other embodiments.

The terms broadcast communication or point-to-multipoint communication are used herein to mean a communication wherein a plurality of subscriber stations are receiving communication from one source.

The terms group service or point-to-multipoint communication are used herein to mean a communication wherein a plurality of subscriber stations are receiving communication from generally one subscriber station.

The term packet is used exclusively herein to mean a group of bits, including data (payload) and control elements, arranged into a specific format. The control elements comprise, e.g., a preamble, a quality metric, and others known to one skilled in the art. Quality metric comprises, e.g., a cyclical redundancy check (CRC), a parity bit, and others known to one skilled in the art.

The term access network is used exclusively herein to mean a collection of access points (AP) and one or more access point controllers. The access network transports data packets between multiple access terminals (AT). The access network may be further connected to additional networks outside the access network, such as a corporate intranet or the Internet, and may transport data packets between each access terminal and such outside networks.

The term base station, referred to herein as an AP in the case of an HDR communication system, is used exclusively herein to mean the hardware with which subscriber stations communicate. Cell refers to the hardware or a geographic coverage area, depending on the context in which the term is used. A sector is a partition of a cell. Because a sector has the attributes of a cell, the teachings described in terms of cells are readily extended to sectors.

The term subscriber station, referred to herein as an AT in the case of an HDR communication system, is used exclusively herein to mean the hardware with which an access network communicates. An AT may be mobile or stationary. An AT may be any data device that communicates through a wireless channel or through a wired channel, for example using fiber optic or coaxial cables. An AT may further be any of a number of types of devices including but not limited to PC card, compact flash, external or internal modem, or wireless or wireline phone. An AT that is in the process of establishing an active traffic channel connection with an AP is said to be in a connection setup state. An AT that has established an active traffic channel connection with an AP is called an active AT, and is said to be in a traffic state.

The term communication channel/link is used exclusively herein to mean a single route over which a signal is transmitted described in terms of modulation characteristics and coding, or a single route within the protocol layers of either the AP or the AT.

The term reverse channel/link is used exclusively herein to mean a communication channel/link through which the AT sends signals to the AP.

A forward channel/link is used exclusively herein to mean a communication channel/link through which an AP sends signals to an AT.

The term network access identifier is used exclusively here to mean The Network Access Identifier (NAI) which is the AT's identifier submitted by the AT during a point-to-point (PPP) authentication. In roaming, the purpose of the NAI is to identify the AT as well as to assist in the routing of the authentication request.

The term soft hand-off is used exclusively herein to mean a communication between a subscriber station and two or more sectors, wherein each sector belongs to a different cell. In the context of IS-95 standard, the reverse link communication is received by both sectors, and the forward link communication is simultaneously carried on the two or more sectors' forward links. In the context of the IS-856 standard, data transmission on the forward link is non-simultaneously carried out between one of the two or more sectors and the AT.

The term softer hand-off is used exclusively herein to mean a communication between a subscriber station and two or more sectors, wherein each sector belongs to the same cell. In the context of the IS-95 standard, the reverse link communication is received by both sectors, and the forward link communication is simultaneously carried on one of the two or more sectors' forward links. In the context of the IS-856 standard, data transmission on the forward link is non-simultaneously carried out between one of the two or more sectors and the AT.

The term re-pointing is used exclusively herein to mean a selection of a sector that is a member of an ATs' active list, wherein the sector is different than a currently selected sector.

The term soft/softer hand-off delay is used exclusively herein to indicate the minimum interruption in service that a subscriber station would experience following a handoff to another sector. Soft/Softer handoff delay is determined based on whether the sector, (currently not serving the subscriber station), (non-serving sector) to which the subscriber station is re-pointing is part of the same cell as the current serving sector. If the non-serving sector is in the same cell as the serving sector then the softer handoff delay is used, and if the non-serving sector is in a cell different from the one that the serving sector is part of then the soft-handoff delay is used.

The term erasure is used exclusively herein to mean failure to recognize a message.

The term outage is used exclusively herein to mean a time interval during which the likelihood that a subscriber station will receive service is reduced.

Description

FIG. 1 illustrates a conceptual diagram of an HDR communication system capable of performing service authorization in accordance with embodiments of the present invention, e.g., a communication system in accordance with the IS-856 standard. The content to be delivered to an access terminal (AT) 112 originates at a remote host (RH) 102. The remote host 102 may be located within the carrier network (not shown) or outside Internet (IP) 104. The content is delivered in a form of packets to a packet data-serving node (PDSN) 106. The PDSN 106 delivers the packets according to the packets' destination to a packet control function (PCF) 108. To illustrate the connection of the high level concepts with the physical access network, FIG. 1 shows that the PCF is physically co-located or even identical, but logically different from a base station controller (BSC). The BSC is a control entity controlling function of access points (AP) 110. The BSC/PCF 108 provides the packets to APs 110.

The AP 110, e.g., AP 110(4) in whose coverage area an Access Terminal (AT) 112, e.g., AT 112(2) for which the packets are destined transmits the packets over a wireless link to the AT 112(2). In accordance with one embodiment, data transmission on the forward link occurs from one AP to one AT at or near the maximum data rate that can be supported by the forward link and the communication system. Other channels of the forward link, e.g., control channel, may be transmitted from multiple APs to one AT. Reverse link data communication may occur from one AT to one or more APs. Although only five AT's and two APs are shown in FIG. 1, one of ordinary skill in the art recognizes that this is for tutorial purposes only, and the communication system can comprise plurality of AT's and AP's. Additionally, one of ordinary skills in the art understands that the choice of an HDR communications system for explanation of concepts of the present invention is for tutorial purposes and will be able to extend the disclosed concepts to other communications systems.

Figure 2:
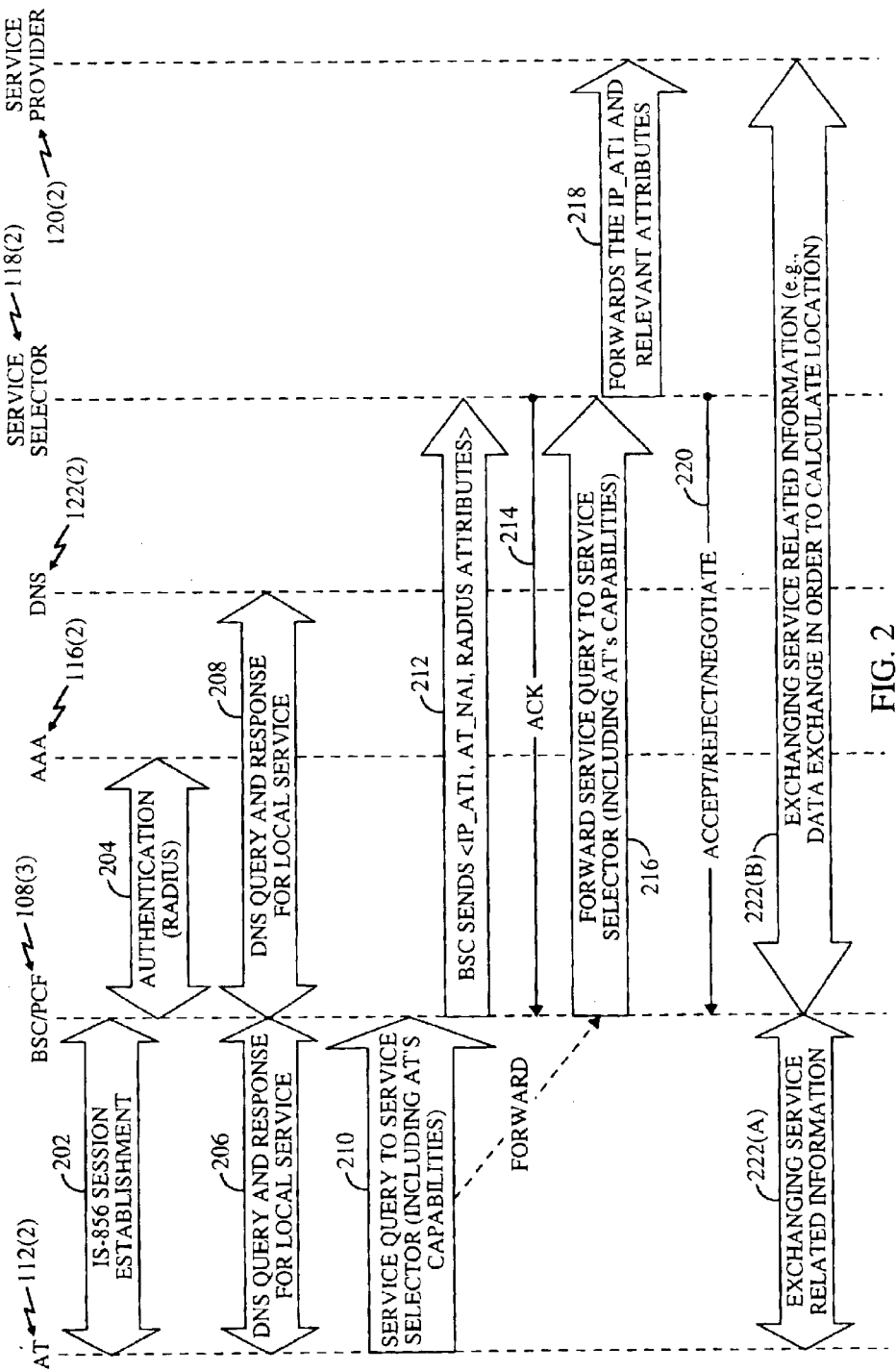
FIG. 2 illustrates an information flow between various entities in the HDR communication system for service authorization in accordance with an embodiment of the invention.

Initially, the AT 112(2) and the AP 110(4), establish a communication link using a predetermined access procedure. In accordance with one embodiment, the access procedure is carried out in accordance with the IS-856 standard. In this connected state, the AT 112(2) is able to receive data and control messages from the AP 110(4) over a forward link 124, and is able to transmit data and control messages to the AP 110(4) over a reverse link 122. Once the communication link between the AT 112(2) and the AP 110(4) is established, a communication session between the AT 112(2) and the BSC/PCF 108(3) can be established, and the AT 112(2) can receive services from the access network. The information flow between various entities in the communication system of FIG. 1 subsequent to establishing a communication link between the AT 112(2) and the AP 110(4) is illustrated in FIG. 2. Because the function of the AP 110(4) is to maintain the communications link and serve as a conduit of information between the AT 112(2) and the BSC/PCF 108(3), the AP 110(4) is not shown in FIG. 2. However, one of ordinary skills in the art understands that all information flow between the AT 112(2) and the BSC/PCF 108(3) passes through the AP 110(4).

Before any AT may receive any services from the access network, the access network must first be satisfied that the AT requesting the service is allowed to use the access network. In accordance with one embodiment, the authorization is carried out by an Authentication Authorization and Accounting (AAA). Once the AAA authorizes the AT for the communication link use, services provided by the access network are authenticated by service selectors (SS) that use the attributes contained in the AAA to verify that the AT requesting the service is authorized to use the service. If the SS verifies that the AT is authorized to receive the service, the SS selects one service provider (SP) to provide the service. The service provider is selected in accordance with the AT capabilities. Each individual service is authorized by a distinct SS and provided by at least one SP. To facilitate a communication between the AAA server, the SS, and the SP, an AAA 116, an SS 118, and an SP server 120 are coupled to a corresponding BSC/PCF 108 via an Intranet 114. As illustrated in FIG. 1, only one service is offered by each BSC/PCF 108. One of ordinary skills in the art recognizes that this is for tutorial purposes only. The method of authorization is illustrated in details in FIG. 2.

As illustrated in FIG. 2, the AT 112(2) and the BSC/PCF 108(3) establish a communication session 202 using a predetermined access procedure. In one embodiment, the access procedure is carried out in accordance with the IS-856 standard. The AT 112(2) and the BSC/PCF 108(3) each establish a link layer session, e.g., a point-to-point (PPP) session, and the BSC/PCF 108(3) assigns the AT 112(2) an Internet protocol address (IP_$AT_1$),which is valid until the AT 112(2) moves to an area served by another BSC/PCF. The BSC/PCF 108(3) further provides the AT 112(2) with an Internet protocol address of a local dynamic name server (DNS) 122(2). One of ordinary skills in the art recognizes that a link layer protocol different from PPP, e.g., SLIP, or other link layer protocol known to one skilled in the art can be utilized without departing from the scope of the present invention. The AT 112(2) then sends the BSC/PCF 108(3) a network address identifier (AT_NAI). The AT_NAI is unique for each AT.

As discussed above, the AAA 116(2) must authorize the AT 112(2) for the communication session 202. Consequently, once the BSC/PCF 108(3) receives the AT_NAI, the BSC/PCF 108(3) sends an authentication request 204 to the AAA server 116(2) using a Remote Authentication Dial-in User Service (RADIUS) protocol. One of ordinary skills in the art recognized that other protocols known in the art, e.g., DIAMETER or other protocols known to one skilled in the art can be utilized without departing from the scope of the present invention. In one embodiment, the authorization utilizes a challenge handshake authorization Protocol (CHAP). When the AT 112(2) requests the communication session 202, the AAA 116(2) generates a random number, and communicates the random number (sends a "challenge" message) to the AT 112(2). Both the AT 112(2) and the AAA 116(2) use the random number as an input into a method (a one-way hash function) yielding a number. The AT 112(2) then communicates the number (sends a "response" message) to the AAA 116(2). If the number received from the AT 112(2) matches the number calculated at the AAA 116(2), the AAA 116(2) authorizes the communication session 202, otherwise the connection should be terminated. Further details about CHAP are disclosed in a request for comment (RFC) No. 1994. The AAA 116(2) returns authorization 204 for the communication session 202 together with required RADIUS attributes of the AT 112(2). Such required attributes comprise attributes for authorization of additional services. It the AAA 116(2) indicates to the BSC/PCF 108(3) that the AT 112(2) is authorized to use the communication link resources, the AT 112(2) is able to receive data and control messages from the BSC/PCF 108(3), and is able to transmit data and control messages to the BSC/PCF 108(3). The BSC/PCF 108(3) stores the received RADIUS attributes of the AT 112(2).

When the AT 112(2) desires to utilize an additional service, e.g., a position location service, the AT 112(2) generates a dynamic name server (DNS) 122(2) query 206 for a local service by supplying a non-fully qualified name for the local service (e.g., local_ServiceSelector) to the BSC/PCF 108(3). The term non-fully qualified name is used herein to mean a name that does not include the domain name. For example, a name "LocalServer.company.com" is a fully qualified name, but a name "LocalServer" is a non-qualified name. The BSC/PCF 108(3) receives the query 206 and generates a query 208 to the DNS 122(2). The DNS 122(2) responds by providing an Internet protocol address of the requested SS 118(2) (IP_ServiceSelector) to the BSC/PCF 108(3), which forwards the response to the AT 112(2).

Once the AT 112(2) receives the IP_ServiceSelector of the SS 118(2), the AT 112(2) can request the service by generating and sending a service query 210 addressed to the SS 118(2). The service query is a structure comprising a source address, i.e., the AT 112(2) IP_AT$_1$, the destination address, i.e., the IP_ServiceSelector of SS 118(2), and capabilities of the AT 112(2) necessary for determining which service to is to be provided. Such capabilities comprise, e.g., grade of service, radio configuration/technology, and other capabilities known to one of ordinary skills in the art.

The BSC/PCF 108(3) receives the service query 210 and determines whether the AT 112(2) with the IP_AT$_1$, is attempting to contact the SS 118(2) with the IP_ServiceSelector for the first time.

If the determination is positive, the BSC/PCF 108(3) generates a message 212, which includes IP_AT$_1$, AT_NAI, and RADIUS attributes of the AT 112(2) and sends the message 212 to the SS 118(2). The SS 118(2) monitors a pre-determined transfer control protocol (TCP) or user datagram protocol (UDP) for the message 212 and when the message 212 is correctly received, sends an acknowledgement 214 back to the BSC/PCF 108(3). The BSC/PCF 108(3) then forwards the service query 210 that was sent to the BSC/PCF 108(3) by the AT as a query 216 to the SS 118(2). The SS 118(2) then performs service authorization in accordance with the RADIUS attributes. The SS 118(2) sends a response 220 back to the BSC/PCF 108(3) in accordance with the result of authorization. If the service is authorized, the SS 118(2) selects a service provider in accordance with the AT 112(2) capabilities. For example if the AT 112(2) is a terminal in accordance with the IS-856 standard, a service provider capable of supporting services for such a terminal, e.g., service provider 120(2) will be selected. The SS 118(2) then forwards a message 218 comprising the IP_AT$_1$ together with relevant RADIUS attributes of the AT 112(2) to the service provider 120(2). The service provider 120(2) examines the RADIUS attributes and determines what grade of service should be provided to the AT 112(2). Examples of a grade of service for location service are accuracy of position, rate of update, and other grades of service known to one of ordinary skills in the art. The AT 112(2) and the service provider 120(2) then exchange the requested service related information 222(A), 222(B) via the BSC/PCF 108(3).

If the BSC/PCF 108(3) determines that the AT 112(2) with the IP_AT$_1$ has already contacted the entity with the IP_ServiceSelector, there is no reason to re-send the message 212 comprising IP_AT$_1$, AT_NAI, and RADIUS attributes of the AT 112(2) to the SS 118(2). Consequently, the BSC/PCF 108(3) forwards the service query 210 that was sent to the BSC/PCF 108(3) by the AT 112(2) as query 216 to the SS 118(2). The information flow then proceeds as described above after the query 216 has been sent.

As illustrated by the broken line arrow in FIG. 1, while receiving requested services from BSC/PCF 108(3), the AT 112(2) moved form a coverage area of the AT 110(4) to a coverage area of an AT 110(3), which is connected to a BSC/PCF 108(2). To enable the AT 112(2) to continue reception of services, first the communication link is transferred from the AP 110(4) to the AP 110(3), which results in the communication session being transferred form the BSC/PCF 108(3) to the BSC/PCF 108(2). The communication link transfer is disclosed in co-pending application Ser. No. 09/892,378, entitled "METHOD AND APPARATUS FOR SELECTING A SERVING SECTOR IN A DATA COMMUNICATION SYSTEM," filed Jun. 26, 2001 and co-pending application Ser. No. 09/915,736, entitled METHOD AND APPARATUS FOR ADAPTIVE SERVER SELECTION IN A DATA COMMUNICATION SYSTEM, filed Jul. 26, 2001, both assigned to the assignee of the present invention. Then, a new link layer session, (e.g., the PPP session) is established between the AT 112(2) and the BSC/PCF 108(2), which results in an assignment of a new IP address (IP_AT$_2$) to the AT 112(2) by the BSC/PCF 108(2). This IP_AT$_2$ is in general different from the IP_AT$_1$. To ensure additional service continuity, the SS 118(2) must be notified about the new binding between the IP_AT$_2$ address and AT_NAI.

In one embodiment, the new binding is achieved by repeating the process of authorization as described in FIG. 2. However, because such approach is wasteful on both computational resources and signaling load, a binding notification in accordance with another embodiment of the invention is illustrated in FIG. 3.

Figure 3:
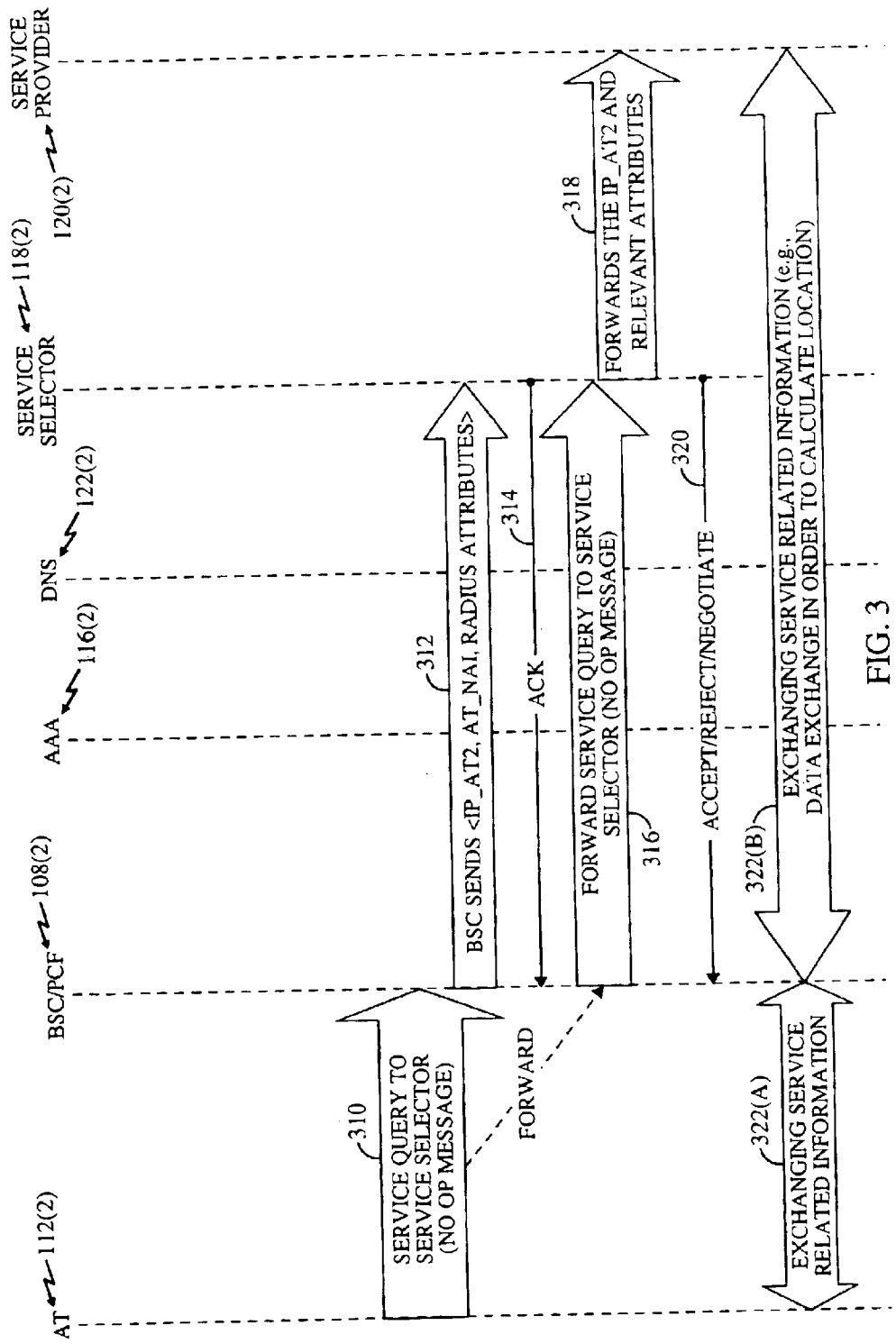
FIG. 3 illustrates an information flow between various entities in the HDR communication system for service authorization in accordance with an embodiment of the invention.

As illustrated in FIG. 3, after the AT 112(2) has established a communication session with the BSC/PCF 108(2) and requested and received an address for a local Service-Selector (IP_ServiceSelector), i.e., the SS 118(2), the AT 112(2) generates a No-Op message 310 addressed to the SS 118(2). The No-Op message 310 has the same structure as a service query, comprising a source address, i.e., the AT 112(2) IP_AT$_2$, and a destination address, i.e., the IP_ServiceSelector of SS 118(2), but the field reserved for the AT's 112(2) capabilities necessary for determining which service is to be provided is empty.

As described, the BSC/PCF examines only a source and destination address of a request addressed form an AT to a SS; therefore, from the BSC/PCF 118(2) perspective, there is no difference between a service query and a No-Op message. Consequently, the BSC/PCF 118(2) examines the service query/No-Op message 310 and determines that the AT 112(2) with the IP_AT$_2$ is attempting to contact the SS 118(2) with the IP_ServiceSelector for the first time. Therefore, the BSC/PCF 118(2) sends a message 312 comprising the IP_AT$_2$, AT_NAI, and RADIUS Attributes to the SS 118(2). The SS 118(2) monitors a predetermined transfer control protocol (TCP) or (UDP) for the message 312 and when the message 312 is correctly received, updates the old bindings between the IP_AT$_1$, AT_NAI, and RADIUS attributes to the new bindings between the IP_AT$_2$, AT_NAI, and RADIUS attributes, and sends an acknowledgement 314. The BSC/PCF 108(2) then forwards the service query/No-Op message 310 that was sent to the BSC/PCF 108(2) by the AT 112(2) as service query/No-Op message 316 to the SS 118(2). The SS 118(2) sends a response 320 back to the BSC/PCF 108(3), and forwards a message 318 comprising the IP_AT$_2$ of the AT 112(2) together with relevant RADIUS attributes to a service provider 120(2). Because the service query/No-Op message 310 does not contain the AT 112(2) capabilities, it appears that the exchange 316–320 is unnecessary because no information is communicated by forwarding the service query/No-Op message 316. Recall, however, that adding or removing a service should not require change (hardware or software) to the service independent part of the access network. Consequently, such an arrangement does not require a modification of BSC/PCF 108(2) because the BSC/PCF does not need to distinguish between a service query and a No-Op message.

If a modification of BSC/PCF is acceptable, in another embodiment, upon receiving the service query/No-Op message 310 addressed to the SS 118(2), the BSC/PCF 108(2) examines not only whether the AT 112(2) with the IP_AT$_2$ is attempting to contact the SS 118(2) with the IP_ServiceSelector for the first time, but also whether the service query/No-Op message 310 is a No-Op message. If the service query/No-Op message 310 is not a No-Op message, the information flow continues as described above. If the service query/No-Op message 310 is a No-Op message, the BSC/PCF 108(2) does not forward the No-Op message 310 that was sent to the BSC/PCF 108(2) by the AT 112(2) as service query/No-Op message 316 to the SS 118(2) after successful receipt of the acknowledgement 314.

The service provider 120(2) examines the attributes and determines what grade of service should be provided to the AT 112(2). The AT 112(2) and the service provider 120(2) then exchange the requested service related information 322(A), 322(B) via the BSC/PCF 108(2).

One of ordinary skill in the art recognizes, that whether the SS 118(2) performs service authorization in accordance with the RADIUS attributes after receiving the No-Op message 310 depends on an implementation of the SS 118(2). Consequently, if the SS 118(2) remembers that an AT with AT_NAI was already authorized, no further authorization is necessary, and the response 322 indicates that the AT is authorized. Otherwise, the SS 118(2) performs service authorization and sends a response 322 back to the BSC/PCF 108(2) in accordance with the result of authorization.

Those of ordinary skill in the art will recognize that although the various embodiments were described in terms of flowcharts and methods, such was done for pedagogical purposes only. The methods can be performed by an apparatus, which in one embodiment comprises a processor interfaced with a transmitter and a receiver or other appropriate blocks at the AT and/or AP.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method for service authorization and offering at least one service, each of said at least one service being administered by a distinct service selector, the method comprising:
   receiving at a controller a service query addressed to a service selector;
   determining whether said service query addressed to the service selector is received for the first time; and if said if said determining is positive then:

determining whether said service query addressed to the service selector comprises a No-Op message, and if said determining is negative then:
  providing from the controller a set of parameters to the service selector in accordance with said service query; and
  authorizing at the service selector said service in accordance with said set of parameters.

2. The method as claimed in claim 1, wherein said providing from the controller the set of parameters to the service selector comprises:
  determining a source address from said service query; and
  sending said set of parameters to the selector indicated by said source address.

3. The method as claimed in claim 1, further comprising:
  receiving at the controller the set of parameters from an authentication, authorization and accounting server.

4. A method for service authorization and offering at least one service, each of said at least one service being administered by a distinct service selector, the method comprising:
  transmitting from a subscriber station a service query addressed to a service selector administering a desired service;
  receiving at a controller said service query addressed to the service selector;
  determining whether said service query addressed to the service selector is received for the first time; and if said determining is positive then:
    determining whether said service query addressed to the service selector comprises a No-Op message, and if said determining is negative then:
      providing from the controller a set of parameters to the service selector in accordance with said service query; and
      authorizing at the service selector said service in accordance with said set of parameters.

5. The method as claimed in claim 4, wherein said providing from the controller a set of parameters to the service selector comprises:
  determining a source address from said service query; and
  sending said set of parameters indicated by said source address.

6. The method as claimed in claim 4, further comprising:
  requesting at a subscriber station an address of a service selector administering a desired service.

7. The method as claimed in claim 4, further comprising:
  receiving at the controller said set of parameters from a server.

8. The method as claimed in claim 7, wherein said receiving at the controller said set of parameters from said server comprises:
  receiving at the controller said set of parameters from a server when the subscriber station establishes a communication with the communication system.

9. A method for providing services in a communication system offering at least one service, each of said at least one service being administered by a distinct service selector, the method comprising:
  receiving at a controller a service query addressed to a service selector;
  determining whether said service query addressed to the service selector is received for the first time; and if said determining is positive then:
    determining whether said service query addressed to the service selector comprises a No-Op message, and if said determining is negative then:
      providing from the controller a set of parameters and said service query to the service selector;
      authorizing at the service selector said service in accordance with said set of parameters;
      selecting at the service selector a service provider to provide said service in accordance with said service query; and
      providing service related information by the service provider.

10. The method as claimed in claim 9, further comprising:
  receiving at the controller said set of parameters from a server.

11. The method as claimed in claim 9, wherein if said determining that said service query addressed to the service selector comprises a No-Op message is positive then the method comprises:
  providing from the controller a set of parameters to the service selector;
  providing from the service provider at least one parameter from said set of parameters to the service provider; and
  providing service related information by the service provider.

12. The method as claimed in claim 11, further comprising:
  authorizing at the service selector said service in accordance with said set of parameters.

13. The method as claimed in claim 9, wherein if said determining whether said service query addressed to the service selector is received for the first time is negative then the method comprises:
  forwarding said service query to the service selector;
  selecting at the service selector a service provider to provide said service in accordance with the service query; and
  providing service related information by the service provider.

14. A method for providing services in a communication system offering at least one service, each of said at least one service being administered by a distinct service selector, the method comprising:
  transmitting from a subscriber station a service query addressed to a service selector administering a desired service;
  receiving at a controller said service query addressed to the service selector;
  determining whether said service query addressed to the service selector is received for the first time; and if said determining is positive then:
    determining whether said service query addressed to the service selector comprises a No-Op message, and if said determining is negative then:
      providing from the controller a set of parameters and said service query to the service selector;
      authorizing at the service selector said service in accordance with said set of parameters;
      selecting at the service selector a service provider to provide said service in accordance with said service query; and
      providing service related information by the service provider.

15. The method as claimed in claim 14, wherein if said determining that said service query addressed to the service selector comprises a No-Op message is positive then the method comprises:
  providing from the controller a set of parameters to the service selector;

providing from the service provider at least one parameter from said set of parameters to the service provider; and providing service related information by the service provider.

16. The method as claimed in claim 15, further comprising:

authorizing at the service selector said service in accordance with said set of parameters.

17. The method as claimed in claim 15, wherein if said determining whether said service query addressed to the service selector is received for the first time is negative then the method comprises:

forwarding said service query to the service selector;

selecting at the service selector a service provider to provide said service in accordance with the service query; and providing service related information by the service provider.

18. The method as claimed in claim 14, further comprising:

receiving at a subscriber station an address of a service selector administering a desired service.

19. The method as claimed in claim 14, further comprising:

receiving at the controller said set of parameters from a server.

20. The method as claimed in claim 19, wherein said receiving at the controller said set of parameters from a server comprises:

receiving at the controller said set of parameters from the server when the subscriber station establishes a communication with the communication system.

21. An apparatus for service authorization in a communication system offering at least one service, each of said at least one service being administered by a distinct service selector, the apparatus comprising:

a controller configured to:
  receive a service query addressed to a service selector;
  determine whether the service query addressed to the service selector is received for the first time; and if said determining is positive then:
    determine whether the service query addressed to the service selector comprises a No-Op message, and if said determining is negative then:
      provide a set of parameters to the service selector in accordance with the service query; and at least one service selector communicatively coupled to said controller configured to:
  receive said set of parameters from said controller; and
  authorize the service in accordance with the set of parameters.

22. The apparatus as claimed in claim 21, wherein said controller is configured to provides said set of parameters to the service selector by being configured to:

determine a source address from the service query; and provide the set of parameters indicated by the source address to the service selector.

23. The apparatus as claimed in claim 21, further comprising:

a server communicatively coupled to said controller configured to provide said set of parameters to said controller.

24. An apparatus for service authorization in a communication system offering at least one service, each of said at least one service being administered by a distinct service selector, the apparatus comprising:

a subscriber station configured to transmit a service query addressed to a service selector administering a desired service;

a controller communicatively coupled to said subscriber station configured to:
  receive a service query addressed to the service selector;
  determine whether the service query addressed to the service selector is received for the first time; and if said determining is positive then:
    determine whether the service query addressed to the service selector comprises a No-Op message, and if said determining is negative then:
      provide a set of parameters to the service selector in accordance with the service query; and at least one service selector communicatively coupled to said controller configured to:
  receive a set of parameters from said controller; and
  authorize the service in accordance with the set of parameters.

25. The apparatus as claimed in claim 24, wherein said controller is configured to provide the set of parameters to the service selector in accordance with the service query by being configured to:

determine a source address from the service query; and provide the set of parameters indicated by the source address to the service selector.

26. The apparatus as claimed in claim 24, wherein said subscriber station is further configured to:

request an address of a service selector administering a desired service.

27. The apparatus as claimed in claim 24, further comprising:

a server configured to provide the set of parameters to said controller.

28. The apparatus as claimed in claim 27, wherein said server is configured to:

provide to said controller the set of parameters when said subscriber station establishes a communication with the communication system.

29. An apparatus for providing services in a communication system offering at least one service, each of said at least one service being administered by a distinct service selector, the apparatus comprising:

a controller configured to:
  receive a service query addressed to a service selector;
  determine whether the service query addressed to the service selector is received for the first time; and if said determining is positive then:
    determine whether the service query addressed to the service selector comprises a No-Op message, and if said determining is negative then:
      provide a set of parameters and the service query to the service selector; and at least one service selector communicatively coupled to said controller configured to:
  receive a set of parameters from said controller;
  receive a service query from said controller;
  authorize the service in accordance with the set of parameters;
  select a service provider to provide the service in accordance with the service query; and at least one service provider configured to provide service related information.

30. The apparatus as claimed in claim 29, further comprising:
a server configured to provide a set of parameters to said controller.

31. The apparatus as claimed in claim 29, wherein if said controller determines that said service query addressed to the service selector comprises a No-Op message then:
said controller is configured to provide a set of parameters to the service selector; and
said service provider is configured to provide at least one parameter from the set of parameters to the service provider.

32. The apparatus as claimed in claim 31, wherein said service provider is further configured to:
authorize the service in accordance with the set of parameters.

33. The apparatus as claimed in claim 29, wherein if said controller determines that the service query addressed to the service selector is not received for the first time then the controller is configured to:
forward the service query to the service selector.

34. An apparatus for providing services in a communication system offering at least one service, each of said at least one service being administered by a distinct service selector, the apparatus comprising:
a subscriber station configured to transmit a service query addressed to a service selector administering a desired service;
a controller communicatively coupled to said subscriber station configured to:
receive a service query addressed to a service selector;
determine whether the service query addressed to the service selector is received for the first time; and if said determining is positive then:
determine whether said service query addressed to the service selector comprises a No-Op message, and if said determining is negative then:
provide a set of parameters and the service query to the service selector; and
at least one service selector communicatively coupled to said controller configured to:
receive a set of parameters from said controller;
receive a service query from said controller;
authorize the service in accordance with the set of parameters.
select a service provider to provide the service in accordance with the service query; and
at least one service provider configured to provide service related information.

35. The apparatus as claimed in claim 34, wherein said subscriber station is further configured to:
request an address of a service selector administering a desired service.

36. The apparatus as claimed in claim 34, further comprising:
a server configured to provide a set of parameters to said controller.

37. The apparatus as claimed in claim 36, wherein said server is configured to:
provide to said controller the set of parameters when said subscriber station establishes a communication with the communication system.

38. The apparatus as claimed in claim 34, wherein if said controller determines that said service query addressed to the service selector comprises a No-Op message then:
said controller is configured to provide a set of parameters to the service selector; and
said service provider is configured to provide at least one parameter from said set of parameters to the service provider.

39. The apparatus as claimed in claim 38, wherein said service provider is further configured to:
authorize the service in accordance with the set of parameters.

40. The apparatus as claimed in claim 34, wherein if said controller determines that the service query addressed to the service selector is not received for the first time then the controller is configured to:
forward the service query to the service selector.

41. An apparatus for service authorization in a communication system offering at least one service, each of said at least one service being administered by a distinct service selector, the apparatus comprising:
means for receiving at a controller a service query addressed to a service selector;
means for determining whether said service query addressed to the service selector is received for the first time; and if said determining is positive then:
means for determining whether said service query addressed to the service selector comprises a No-Op message, and if said determining is negative then:
means for providing from the controller a set of parameters to the service selector in accordance with said service query; and
means for authorizing at the service selector said service in accordance with said set of parameters.

42. An apparatus for service authorization in a communication system offering at least one service, each of said at least one service being administered by a distinct service selector, the apparatus comprising:
means for transmitting from a subscriber station service query addressed to a service selector administering a desired service;
means for receiving at a said controller said service query addressed to the service selector;
means for determining whether said service query addressed to the service selector is received for the first time; and if said determining is positive then:
means for determining whether said service query addressed to the service selector comprises a No-Op message, and if said determining is negative then:
means for providing from the controller a set of parameters to the service selector in accordance with said service query; and
means for authorizing at the service selector said service in accordance with said set of parameters.

43. An apparatus for providing services in a communication system offering at least one service, each of said at least one service being administered by a distinct service selector, the method comprising:
means for receiving at a controller a service query addressed to a service selector;
means for determining whether said service query addressed to the service selector is received for the first time; and if said determining is positive then:

means for determining whether said service query addressed to the service selector comprises a No-Op message, and if said determining is negative then:
- means for providing from the controller a set of parameters and said service query to the service selector;
- means for authorizing at the service selector said service in accordance with said set of parameters;
- means for selecting at the service selector a service provider to provide said service in accordance with said service query; and
- means for providing service related information by the service provider.

44. An apparatus for providing services in a communication system offering at least one service, each of said at least one service being administered by a distinct service selector, the method comprising:

means for transmitting from a subscriber station service query addressed to a service selector administering a desired service;

means for receiving at a controller said service query addressed to the service selector;

means for determining whether said service query addressed to the service selector is received for the first time; and if said determining is positive then:
- means for determining whether said service query addressed to the service selector comprises a No-Op message, and if said determining is negative then:
  - means for providing from the controller a set of parameters and said service query to the service selector;
  - means for authorizing at the service selector said service in accordance with said set of parameters;
  - means for selecting at the service selector a service provider to provide said service in accordance with said service query; and
  - means for providing service related information by the service provider.

\* \* \* \* \*

UNITED STATES PATENT AND TRADEMARK OFFICE
CERTIFICATE OF CORRECTION

PATENT NO. : 6,850,983 B2  
DATED : February 1, 2005  
INVENTOR(S) : Ramin Rezaiifar and Paul E. Bender It is certified that error appears in the above-identified patent and that said Letters Patent is hereby corrected as shown below:

Title page,
Item [74], *Attorney, Agent, or Firm*, "Pavel Kolousek" should read -- Pavel Kalousek --.

Signed and Sealed this

Twenty-third Day of August, 2005

JON W. DUDAS
*Director of the United States Patent and Trademark Office*